Figure 1:
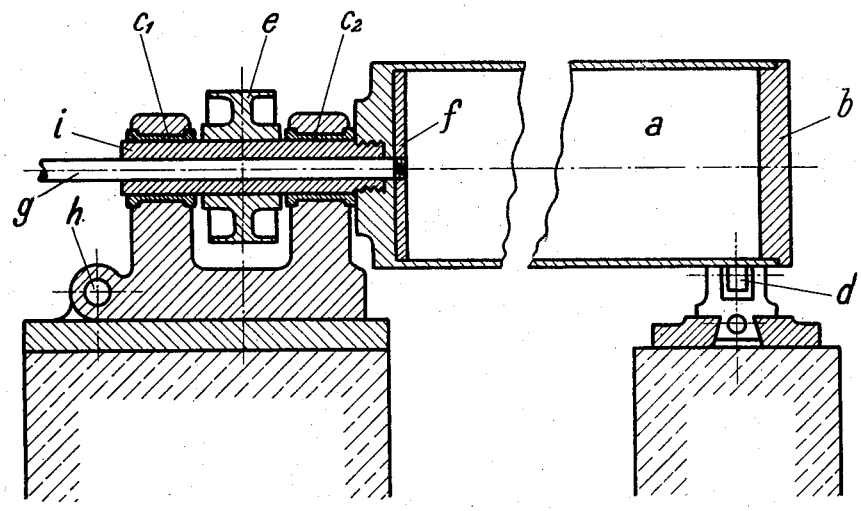

March 26, 1935.   V. GONDA   1,995,977
METHOD OF PRODUCING HOLLOW OBJECTS
Filed July 26, 1932

Patented Mar. 26, 1935

1,995,977

UNITED STATES PATENT OFFICE 1,995,977

METHOD OF PRODUCING HOLLOW OBJECTS

Vilmos Gonda, Budapest, Hungary

Application July 26, 1932, Serial No. 624,860
In Hungary February 16, 1931

1 Claim. (Cl. 18—58)

The pressing of materials capable of being formed into shapes in hot condition is effected by filling the heated material into a mould of suitable form, consisting, as a rule, of two parts, and after one part of the mould has been fixed in a suitable manner, allowing mechanical forces to act on the other part of the mould. The pressing forces (pressures) employed in this manner act in their totality in one direction only, viz, in the direction of the displacement of the movable part of the mould; it is preferable to make the pressing forces act in the direction of the smallest dimension of the object to be produced by pressing.

When producing hollow objects by means of pressing, the mould employed is fitted with a core corresponding to the cavity. In such cases it is preferable, in order to obtain as uniform compression as possible, to employ the pressure in the direction of the axis of the core, even in the case in which this direction does not coincide with the direction of the smallest dimension of the object; compression will not be uniform particularly in the case of the production by means of pressing of objects, the dimension in the direction of the axis of the cavity of which is many times their other dimension (for instance, of tubes) because whilst the material situated in the direction of pressure at the two extremities of the object will be compressed in the necessary degree, the compression of the material situated in the middle part of the object will be insufficient or in an extreme case the last-named material may possibly not receive any compression at all.

In such cases a pressure, the direction of which is perpendicular to the axis of the cavity, but which acts simultaneously and in an equal manner in the direction of all lines perpendicular to the said axis is the most advantageous, because it enables uniform compression to be obtained, owing to the fact that the object will receive in its totality, and everywhere in the direction of its smallest dimension, a pressure of equal magnitude and equal sense. This end cannot be achieved by the employment of mechanical forces alone and therefore it is endeavored in the process forming the subject matter of the present patent to obtain the optimum pressure, i. e. a pressure acting simultaneously and in an equal measure in the direction of all the lines perpendicular to the longitudinal axis of the cavity, by employing one mechanical force I and two physical forces II, III.

With this object in view the material (for instance substances which contain gas-evolving constituents, such as bituminous substances, resins, artificial resins, also aqueous emulsions or solutions of such substances in volatile solvents and the like), heated at least up to the point where the gases commence to be evolved, is filled into a mould which is capable of being hermetically sealed. The mould is then revolved about its longitudinal axis and heated from the outside, whereby the evolution of the gases from the material in the mould is assisted. After the desired internal pressure is reached the supply of heat is discontinued and the mould suddenly cooled down.

The mechanical force (I) referred to above is produced by the hermetically closed mould containing the material which is plastic or liquid when in the hot state being revolved, whereby a pneumatic core is formed in it.

The physical force (II) is the pressure directed from the inside to the outside of the gases and vapours evolved from the material through the supply of heat to the mould. The mould into which the preheated material is introduced may be cold or it may be preheated. The further supply of heat to the mould or to the material may be effected in any suitable manner.

Owing to the fact that during the revolving motion of the mould a pneumatic core is formed in the heated material, which replaced the usual solid core, the gases and vapours evolving from the material can escape to the pneumatic core. By this means the pressure within the moulded article is gradually increased and the material is pressed with increasing force against the inside of the mould wall. Consequently not only is the material compressed both by the mechanical centrifugal force and by the continuously increasing physical pressure of the gases and vapours imprisoned in the cavity of the article, but, owing to the fact that the gases can escape freely out of the material, completely non-porous and homogeneous, solid moulded articles are obtained.

The physical force (III) is produced by the sudden cooling of the metal mould which has expanded through being heated, causing the material of the mould to contract and to exert on the material being moulded a compressive force which is oppositely directed to the forces (I) and (II). This produces a further compression of the moulded article.

In the accompanying drawing a constructional example of the apparatus according to the invention for carrying out the present process is shown.

Figure 2:
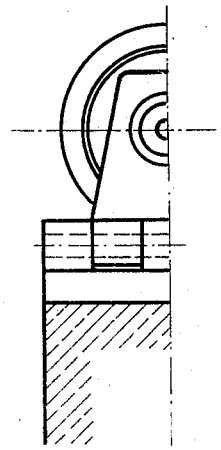
Figure 3:
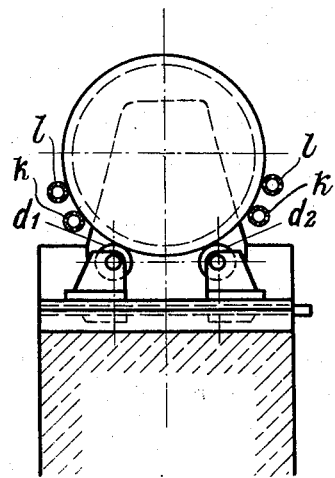

Fig. 1 is a longitudinal cross sectional view of the apparatus, and Figs. 2 and 3 are elevational end views of the respective ends of Fig. 1.

Into the metal mould $a$ which is adapted to be closed in an air or gas-tight manner and the interior shape of which corresponds to the exterior shape of the article, the material is introduced after being heated, or after being made plastic or liquid by heat at least up to the point where gas or vapour will commence to evolve, whereupon the mould which for the purpose is open on one side is hermetically closed with a cover. The mould held fast by means of the shaft $i$ in the bearings $c_1$ and $c_2$ and supported at its other end by rollers $d_1$ and $d_2$ is arranged so as to be rotatable around the longitudinal axis of the cavity to be formed. The filled mould is with the aid of the pulley $e$ made to rotate at a speed of about 500 revolutions per minute and at the same time the whole mould is heated from any desired source of heat, conveniently by means of oil burners $k$. After the heating period cooling water is passed through perforated tubes $l$ provided for this purpose. The water passes out of the openings of the tubes $l$ against the walls of the rotating cylindrical mold $a$ and thereby cools the same. By means of the centrifugal force set up owing to the high number of revolutions per minute, the soft material is pressed to the inside surface of the metal mould which has become expanded owing to the heat imparted to it, a pneumatic core being formed inside the mould. The material is formed and at the same time compressed through the action of the centrifugal force (force I) which depends on the number of revolutions employed. Simultaneously with this force and in the same sense a compressive force acts, which is produced owing to the supply of heat on the one hand by the gases escaping out of the material and on the other hand through the expansion of the air imprisoned in the pneumatic core, and the magnitude of which is dependent on the quantity or temperature of the heat supply (force II). Both forces (I and II) act in the direction of all possible perpendiculars to the axis of the cavity, this action being centrifugal. Both the forces described above are allowed to act for a certain time, being if necessary increased until the desired compression of the material is reached. Thereupon the supply of heat is cut off and the mould while still revolving at the same speed is cooled down suddenly. Owing to the sudden cooling the expanded metal material of the mould contacts rapidly, thereby producing a compressive force (force III) which also acts in the direction of all possible perpendiculars on the axis of the cavity but in the opposite direction to the forces (I and II) which were described above and are still effective, that is to to say in the centripetal direction.

The compressed article made in this manner is ejected from the mould by means of a plunger in the following manner. The screw spindle $g$ is connected to the shaft $i$ by a key and keyway positively in such a manner that it can move freely only parallel to the shaft. If the free part of the screw spindle projecting from the shaft be held fast close to the shaft and during the rotation of the latter by means of a two-part fixed nut, the spindle $g$ and the plunger $f$ connected to it will move the axial direction and push the finished pressed article which is in the mould out of the latter. The emptied mould is rotated about the pivot $h$ into a vertical position, in which position it can be easily and rapidly filled. The filled mould is thereupon closed again by means of the cover $b$ and brought into the horizontal position, when the pressing operation can be repeated.

What I claim is:

A method of forming hollow bodies from material capable of being formed when in a warm state, more particularly from material containing substances which when heated evolve gases, consisting in introducing the material heated at least to a temperature, at which the evolution of gases will commence, into a mold, closing the mold in a gas-tight manner, imparting a rotary motion to the mold and heating the mold simultaneously thereby causing a pneumatic core to form in the material by gases evolved out of it, cutting off the supply of heat and suddenly cooling down the mold.

VILMOS GONDA.